Jan. 7, 1930.                A. J. FARNSWORTH                 1,742,439
                                FLOAT GAUGE
                             Filed Jan. 24, 1927
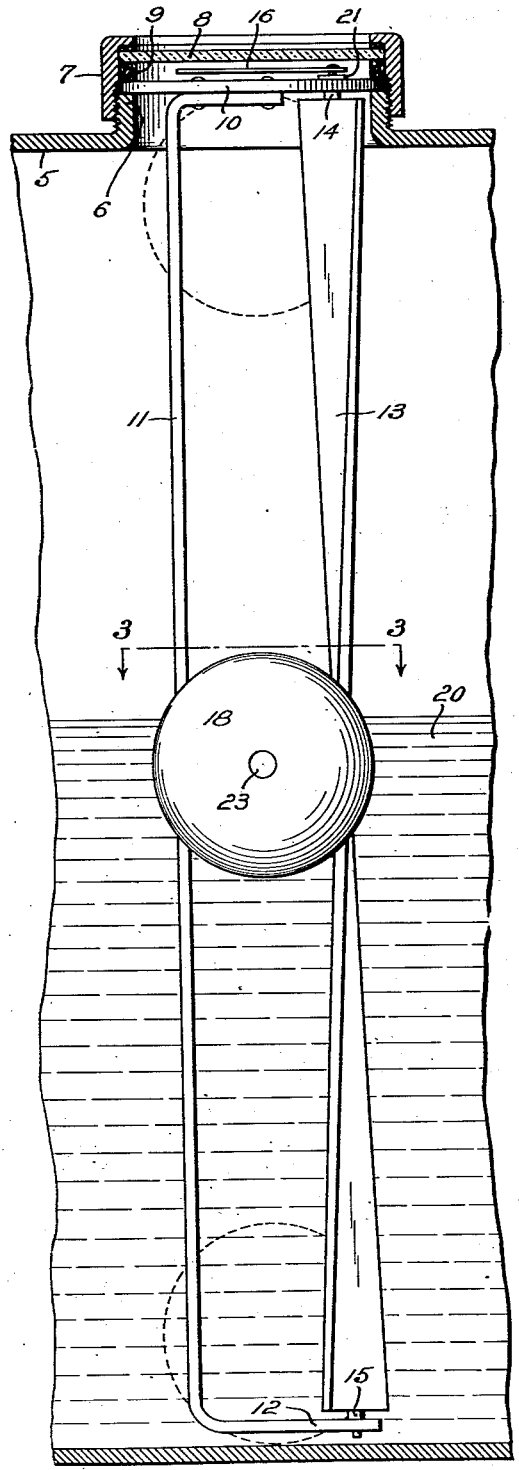
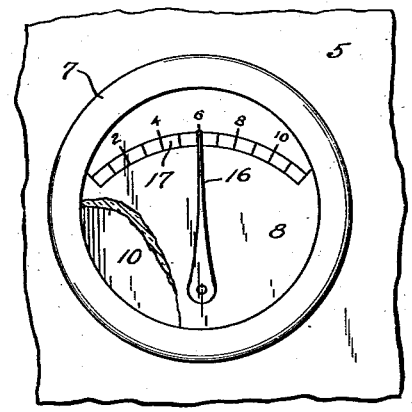
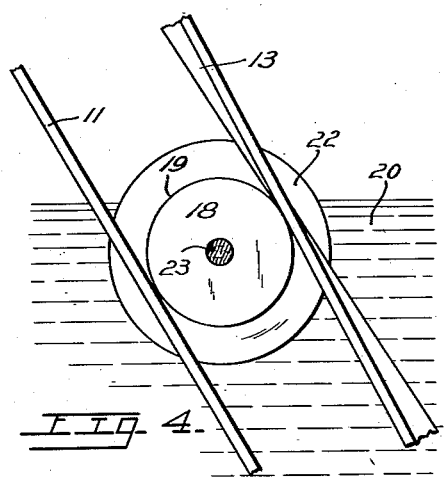
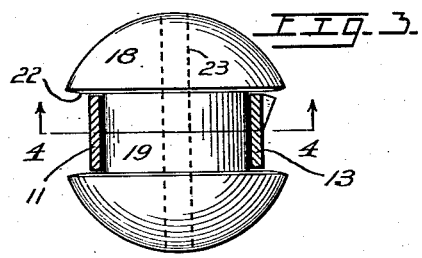
Inventor;
Arthur J. Farnsworth.

Patented Jan. 7, 1930

1,742,439

UNITED STATES PATENT OFFICE

ARTHUR J. FARNSWORTH, OF PASADENA, CALIFORNIA

FLOAT GAUGE

Application filed January 24, 1927. Serial No. 163,137.

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to gauges that are adapted for indicating the levels of liquids by means of a float, or the volumes of confined liquids in the same way. Its principal objects are; first, to provide a device of this nature that is adapted for correctly indicating depths or volumes of liquid on a proportional scale, throughout the range of the instrument; second, to supply a float gauge that is not liable to be damaged or deranged by violent agitation of the liquid in which it works; third, to produce an instrument of this kind that may be used in either a vertical or inclined position; and fourth, to accomplish the foregoing by means of a very simple, and relatively inexpensive construction.

My objects are attained in the manner illustrated in the accompanying drawings, in which—

Figure 1 is a central longitudinal section of a tank with my improved float gauge therein, the view being in elevation;

Figure 2 is a plan view of the indicating portion of my gauge within the tank closure, the view being related to Fig. 1 considered as revolved ninety degrees clockwise about its vertical axis;

Figure 3 is a horizontal cross section of the gauge taken on the line 3—3 of Fig. 1; and Figure 4 is a fragmentary section in elevation, taken on the line 4—4 of Fig. 3, and illustrating the adaptability of the instrument for use in an inclined position.

Similar reference numerals refer to similar parts throughout the several views.

The drawings show my invention applied to a tank 5. This is formed with a screwed nipple 6 at the top, and an internally flanged bezel 7 containing a cover glass 8 is screwed upon the nipple in the usual manner. Beneath the glass, and spaced from it by a packing ring 9, is the circular dial plate 10 of my float gauge. This plate is supported by the upper edge of nipple 6, and is retained in place by the flange of bezel 7 and the intervening elements.

Depending from dial plate 10 is a guide bar 11 of flat rectangular section, bent to form a step 12 at its lower end. A twisted flat bar 13, of the same cross section as the guide bar, is pivotally mounted on its longitudinal axis in the dial plate and in the step, at 14 and 15 respectively.

The pivots are so located that the axis of the twisted bar is parallel to the guide bar. Pivot 14 extends through the dial plate and carries a needle 16 at the tip adapted to read upon scale 17 of the dial plate.

The control member of the device consists of a spherical float 18 having a deep circumferential groove therein. The bottom of this groove constitutes a cylindrical surface 19, adapted to roll upon the inner surfaces of guide bar 11 and twisted bar 13, and the diameter of this cylinder is very slightly less than the space between these bars at points where their inner surfaces are transversely parallel. Obviously therefore the twisted bar will be made to rotate by the spherical float as it travels up and down between the two bars, and the vertical position of the float will determine the angular position of bar 13 and needle 16. By reason of the ability of the float to roll upon the surfaces of its guiding bars, it is possible to eliminate practically all of the friction that otherwise would oppose its movements. Frictional resistance at the pivots is negligible because of their very small diameter and the ease with which they may be kept lubricated. The lower pivot is constantly lubricated by its immersion in liquid 20 in which it works. An absorbent oil-saturated washer 21 at the upper pivot will lubricate it indefinitely.

The sides of the groove in the float preferably are chamfered as at 22 and, for convenience in assembling the device, the float may be made in similar halves held together by a dowel pin 23.

In automobile fuel tanks and other places it often is desirable to have a gauge adapted for use in an inclined position. My invention is particularly adapted for such use by reason of the cylindrical surface 19 of its float which enables it to roll upon its guiding bars in the manner indicated in Fig. 4.

For volumetric use in vertical cylindrical tanks, or in tanks having parallel opposed sides, the twist of bar 13 is made of constant pitch. For volumetric use in horizontal cylindrical tanks or in tanks having diverging opposed sides, the pitch of the twist of bar 13 may be progressively varied in such manner as to compensate for the variable ratio between the depth and volume of the confined liquid, and so as to permit of using a proportional scale at 17. Thus for volumetric use in a horizontal cylindrical tank the pitch of the twist at the center of bar 13 will be less than the pitch at the ends. Even in extreme cases, however, the twist of bar 13 is slight, and its pitch relatively great at all points. The twist never interferes with the rolling action of the float upon the twisted surface of the bar, and the total twist of the bar will rarely be more than one-half turn in its length.

I desire to point out that my improved construction is not likely to be damaged by the action of violently agitated liquid, such as gasoline in an automobile tank. The moving parts are closely confined laterally and are not subject to lateral displacement by wave action. Finally I desire to call attention to the great simplicity of my device, the fewness of its parts, the small space that it requires, and its relative cheapness.

Having thus fully described my invention, I claim:

1. A float gauge comprising; a guide bar; an axially rotatable helical member having its axis parallel to said bar; and a rotatable float intermediate said bar and said member engaging them; said float being adapted by longitudinal displacement to rotate said member, and the axis of rotation of said helical member being perpendicular to the axis of rotation of said float.

2. A float gauge comprising; a straight guide bar; an axially rotatable helical member having its axis parallel to said bar; and a rotatable float having a surface of revolution intermediate and engaging said bar and said member; said float being adapted to rotate said member by longitudinal displacement therealong and to roll against either said member or said bar.

3. A float gauge comprising; a flat guide bar; a helically twisted flat bar rotatable about its longitudinal axis parallel to the guide bar; and a rotatable float intermediate said bars having a cylindrical surface engaging them; said float being adapted by longitudinal displacement therealong to rotate said twisted bar and to roll against it.

4. A float gauge comprising; a dial plate; a guide bar depending from said plate and having a step at its lower end; a helically twisted flat bar axially pivoted in said plate and said step parallel to said guide bar; and a cylindrical float slidable intermediate and along said bars and rotatable about an axis perpendicular thereto and engaging said bars; said float being adapted by longitudinal displacement to rotate said twisted bar and to roll against either of said bars.

ARTHUR J. FARNSWORTH.